(12) United States Patent
Honbo

(10) Patent No.: US 6,989,917 B2
(45) Date of Patent: Jan. 24, 2006

(54) IMAGE READING APPARATUS AND ITS CONTROL METHOD

(75) Inventor: Tsunao Honbo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 976 days.

(21) Appl. No.: 09/842,888

(22) Filed: Apr. 26, 2001

(65) Prior Publication Data

US 2002/0015192 A1 Feb. 7, 2002

(30) Foreign Application Priority Data

Apr. 27, 2000 (JP) ...................... 2000-127752

(51) Int. Cl.
- *H04N 1/04* (2006.01)
- *H01L 27/00* (2006.01)
- *H01S 3/14* (2006.01)

(52) U.S. Cl. .................. 358/475; 358/474; 250/208.1; 250/234; 250/235

(58) Field of Classification Search ................ 358/475, 358/474; 250/208.1, 234, 235
See application file for complete search history.

(56) References Cited

U.S. PATENT DOCUMENTS

| | | | | |
|---|---|---|---|---|
| 5,153,745 A | * | 10/1992 | Brandkamp et al. | ........ 358/406 |
| 6,185,384 B1 | * | 2/2001 | Ishimoto | ...................... 399/47 |
| 6,433,895 B1 | * | 8/2002 | Hansen | ........................ 358/475 |

FOREIGN PATENT DOCUMENTS

| | | |
|---|---|---|
| JP | 4-142865 | 5/1992 |
| JP | 10-254074 | 9/1998 |
| JP | 11-239244 | 8/1999 |
| JP | 11-355570 | 12/1999 |
| JP | 2001-166398 | 6/2001 |

OTHER PUBLICATIONS

English Abstract for JPA4 142865.
English Abstract for JPA11–239244.
English Abstract for JPA11–355570.
English Abstract for JPA2001–166398.
Copy of Office Action dated Apr. 27, 2004 issued in counterpart Japanese Application No. 2000–127752.
English Abstract for JPA 10–254074 (Item A).

* cited by examiner

*Primary Examiner*—Edward Coles
*Assistant Examiner*—Houshang Safaipour
(74) *Attorney, Agent, or Firm*—Morgan & Finnegan, L.L.P.

(57) ABSTRACT

In an image reading apparatus which can operate in a plurality of image processing modes, and includes a photoelectric converter for reading an object image and outputting an electrical signal, a reference white plate used to correct image read nonuniformity by the photoelectric converter, and a lamp for illuminating an object and the reference white plate with light, and its control, the currently set image processing mode is determined, a wait time is set in correspondence with the currently set image processing mode and the lamp is turned on, then the photoelectric converter begins to read the reference white plate after a lapse of the wait time.

33 Claims, 8 Drawing Sheets

IMAGE READING APPARATUS AND ITS CONTROL METHOD

FIELD OF THE INVENTION

The present invention relates to an image reading apparatus such as a copying machine, scanner, facsimile, or the like, and its control method.

BACKGROUND OF THE INVENTION

In a conventional image reading apparatus which irradiates an image surface of a document with light emitted by an illumination light source, forms an optical image of the document on a photoelectric conversion element via a mirror and lens, and converts it into an electrical signal, a cold cathode tube, such as a xenon tube, LED or the like is used as the illumination light source.

However, such illumination light source requires a given period of time from when it begins to emit light in response to an ON signal until the amount of light stabilizes. For this reason, in order to perform satisfactory image reading, the control must wait until the amount of light stabilizes, thus often influencing the read time. FIG. 8 shows a change in read level immediately after a lamp is turned on until the amount of light stabilizes. That is, FIG. 8 shows a change in amount of light immediately after the lamp is turned on, the Y-axis plots the amount of light, and the X-axis plots time. As can be seen from FIG. 8, a given time period is required until the amount of light stabilizes, since overshoot or the like occurs immediately after a document illumination lamp is turned on.

SUMMARY OF THE INVENTION

The present invention has been made in consideration of the above situation, and has as its object to minimize the wait time required for reading an image.

According to the present invention, the foregoing object is attained by providing an image reading apparatus which can operate in a plurality of image processing modes, comprising a photoelectric converter for reading an object image and outputting an electrical signal; a reference member used to correct image read nonuniformity of the photoelectric converter; an illumination light source for illuminating an object and the reference member with light; and a controller for controlling a read start timing of the reference member by the photoelectric converter after the illumination light source is turned on in correspondence with a currently set image processing mode of the plurality of image processing modes.

In one aspect of the present invention, the image reading apparatus comprises a timer for measuring a time period elapsed since the illumination light source is turned on, wherein the controller sets a wait time in correspondence with the currently set image processing mode, and controls the photoelectric converter to begin to read the reference member after a lapse of the wait time since the illumination light source is turned on.

In another aspect of the present invention, the image reading apparatus further comprises a timer for measuring an elapsed time since a previous OFF timing of the illumination light source, and a time since the illumination light source is turned on; and an instruction unit for issuing a read instruction of an object, wherein when the instruction unit issues the read instruction of the object, the controller sets the wait time in correspondence with the elapsed time measured by the timer and the currently set image processing mode, and turns on the illumination light source again, and controls the photoelectric converter to begin to read the reference member after a lapse of the wait time since the illumination light source is turned on.

Further, according to the present invention, the foregoing object is also attained by providing a control method for controlling an image reading apparatus which can operate in a plurality of image processing modes, and includes a photoelectric converter for reading an object image and outputting an electrical signal, a reference member used to correct image read nonuniformity of the photoelectric converter, and an illumination light source for illuminating an object and the reference member with light, wherein a read start timing of the reference member by the photoelectric converter since the illumination light source is turned on is controlled in correspondence with a currently set image processing mode of the plurality of image processing modes.

In one aspect of the present invention, the control method comprises a checking step of checking the currently set image processing mode; a setting step of setting a wait time in correspondence with the currently set image processing mode; a time measurement step of measuring time since the illumination light source is turned on; and a control step of controlling the photoelectric converter to begin to read the reference member after a lapse of the wait time since the illumination light source is turned on.

In another aspect of the present invention, the control method comprises an instruction step of issuing a read instruction of an object; a first time measurement step of measuring an elapsed time since a previous OFF timing of the illumination light source; a checking step of checking the currently set image processing mode; a setting step of setting, when the read instruction of the object is issued in the instruction step, the wait time in correspondence with the elapsed time measured in the first time measurement step, and the currently set image processing mode; a turn-on step of turning on the illumination light source; a second time measurement step of measuring time since the illumination light source is turned on; and a control step of controlling the photoelectric converter to begin to read the reference member after a lapse of the wait time since the illumination light source is turned on again.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

(First Embodiment)

Figure 1:
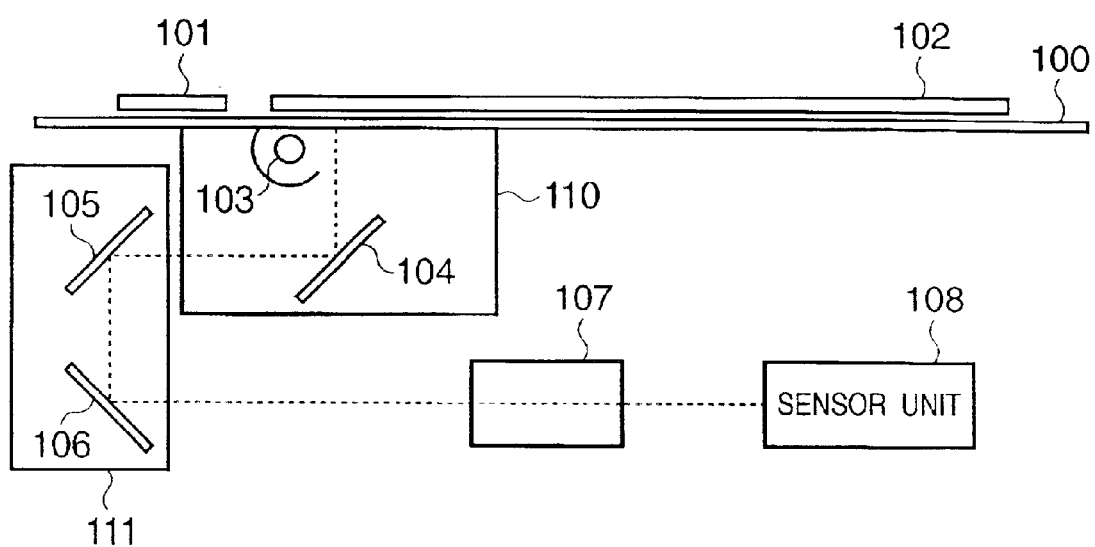
FIG. 1 is a schematic view showing the arrangement of an image reading apparatus in the first and second embodiments of the present invention.
Figure 2:
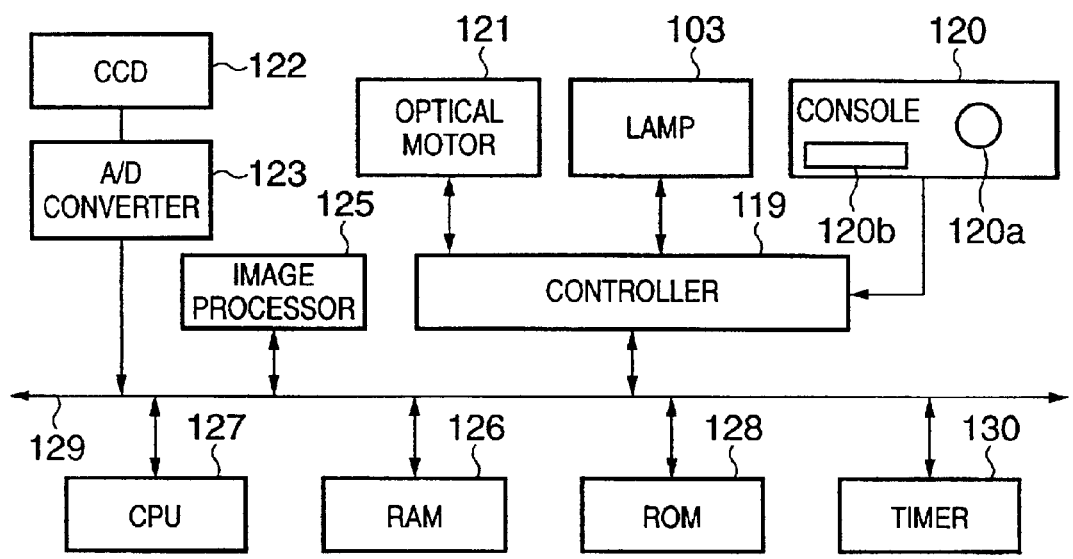
FIG. 2 is a block diagram showing the arrangement of a control system of the image reading apparatus in the first and second embodiments of the present invention.
Figure 3:
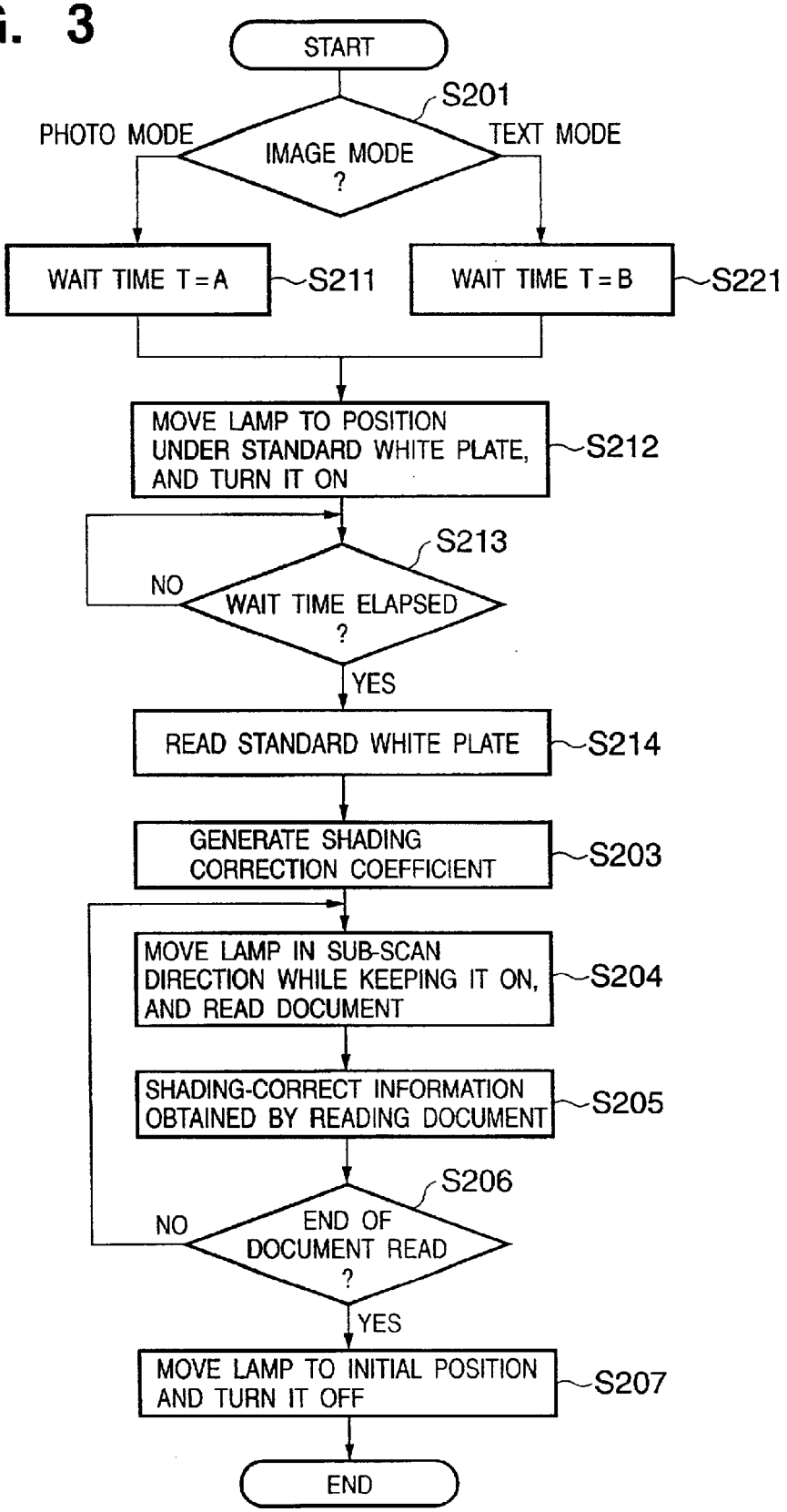
FIG. 3 is a flow chart showing the control sequence of the image reading apparatus in the first embodiment of the present invention.

FIG. 1 shows the arrangement of an image reading apparatus, FIG. 2 shows a control system of the image reading apparatus, and FIG. 3 shows an example of an image read sequence. Referring to FIG. 1, a standard white plate 101 is provided on a platen 100 on which a document 102 is placed. The standard white plate 101 is a member which provides a reference upon correcting image read nonuniformity of a photoelectric conversion element such as a CCD or the like. This correction is generally called shading correction. The standard white plate 101 and document 102 are irradiated with light emitted by a lamp 103, and the light reflected by them forms an image on a CCD in a sensor unit 108 via mirrors 104 to 106 disposed in optical units 110 and 111, and a lens unit 107 and is photoelectrically converted. In this way, shading correction data, and image information of the document 102 are obtained.

FIG. 2 is a block diagram showing an example of the arrangement of a control system of the image reading apparatus. The image reading apparatus has an arrangement in which a controller 119, image processor 125, RAM 126, CPU 127, ROM 128, timer 130, and the like are connected to each other via a bus 129. To the controller 119, an optical motor 121 for driving the optical units 110 and 111 along the platen 100 in the sub-scan direction, the lamp 103, a console 120 on which a copy button 120a that can set a text mode, photo mode, and other image modes, a display unit 120b, and the like are arranged, and the like are connected. A CCD 122 is connected to the bus 129 via an A/D converter 123.

An example of the image read control sequence will be described in detail below using FIG. 3.

When the controller 119 of the image reading apparatus detects a signal which indicates that an image read start operation has been done upon depression of the copy button 120a on the console 120, this sequence starts. In step S201, the controller 119 discriminates the image mode currently set by the copy button 120a, and the flow advances to the next process in accordance with the discrimination result. Assume that the image reading apparatus can be set in either a text or photo mode.

If the photo mode is detected in step S201, the flow advances to step S211 to set wait time T=A. On the other hand, if the text mode is detected in step S201, the flow advances to step S221 to set wait time T=B.

The wait time T is set as a fixed value in consideration of the time required until the amount of light sufficiently stabilizes after the lamp 103 begins to emit light. That is, the wait time T is substantially a wait time from when the illumination light source begins to emit light until image information used as reference for correcting image read nonuniformity begins to be read. Therefore, if the signal obtained after a lapse of the wait time is an effective signal, the same effect as in this embodiment can be obtained even when photoelectric conversion is done either before or after the lapse of the wait time T. The start timing of the wait time T can be a start point at which the ON time of the illumination light source can be expected. Hence, when detection timing of a mode signal is set as the start timing of the time T, the same effect as in the first embodiment can be obtained.

Figure 6:
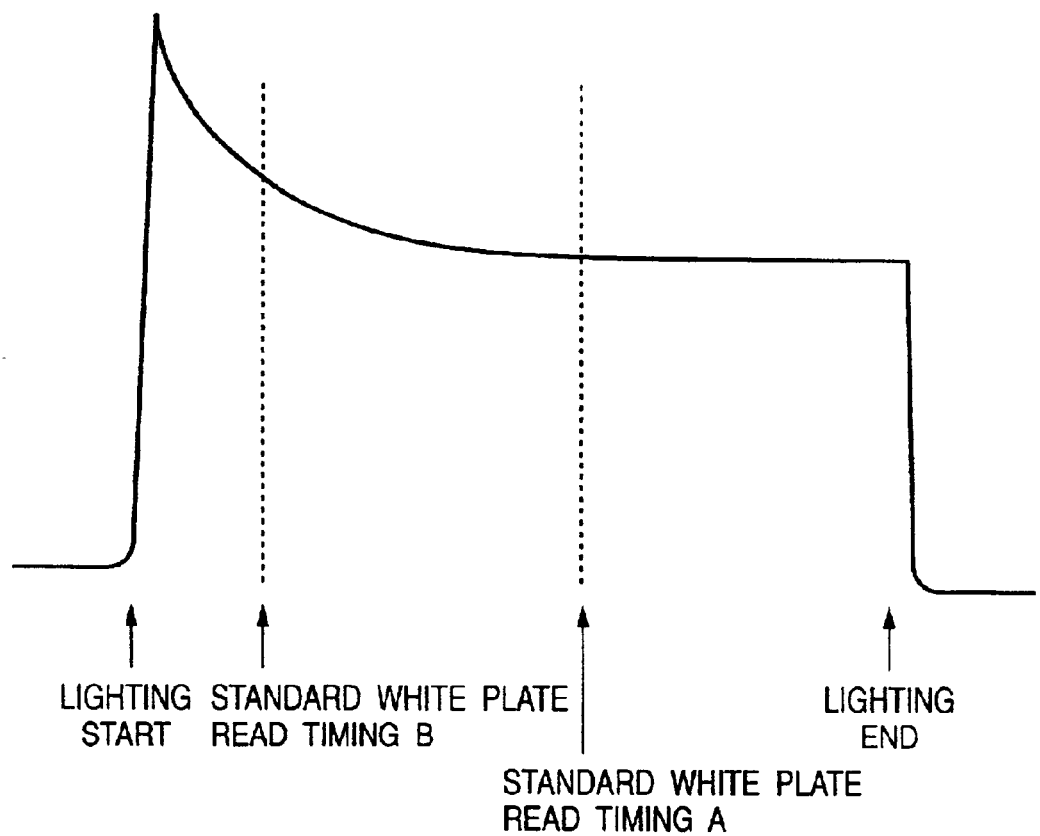
FIG. 6 is a graph for explaining the relationship between the standard white plate read level and read timing in the first embodiment of the present invention.

As shown in FIG. 6, the wait time T=A is the time required until the amount of light emitted by the lamp 103 stabilizes, while the wait time T=B is the time before a stable region is reached via overshoot of the amount of light after the lamp 103 is turned on in the first embodiment.

After the lamp 103 and mirrors 104 to 106 are moved to a home position (initial position), the lamp 103 is located under the standard white plate 101 and is turned on (step S212). After a lapse of the wait time A or B (YES in step S213), image information of the standard white plate 101 is read (step S214). If the read level of the standard white plate is lower than a predetermined value, a predetermined error message may be displayed on the display unit 120b on the console 120 of the image reading apparatus. On the other hand, if the read level of the standard white plate 101 is equal to or higher than a predetermined value, a shading correction coefficient is computed by:

shading correction coefficient=255×(standard white plate level)/(under color level) (1)

The computed shading correction coefficient is stored in the RAM 126 (step S203). In equation (1), the under color level is a predetermined level indicating the background color of a document in a predetermined mode such as a photo mode, text mode, or the like.

After that, the lamp 103 and mirrors 104 to 106 are moved in the sub-scan direction while the lamp 103 is kept ON, thus reading image information of the document 102 (step S204). The read image information of the document is corrected in step S205 by:

image information=shading coefficient×(image information of document)/(image information of standard white plate) (2)

In this manner, image information from which image read nonuniformity is corrected is generated.

It is checked if the end of read of the document 102 is detected (step S206). If NO in step S206, the flow returns to step S204 to further move the lamp 103 in the sub-scan direction, thus reading image information of the document 102. On the other hand, if YES in step S206, the optical units 110 and 111 are moved to an initial position, and the lamp 103 is turned off, thus ending the process (step S207).

Figure 7:
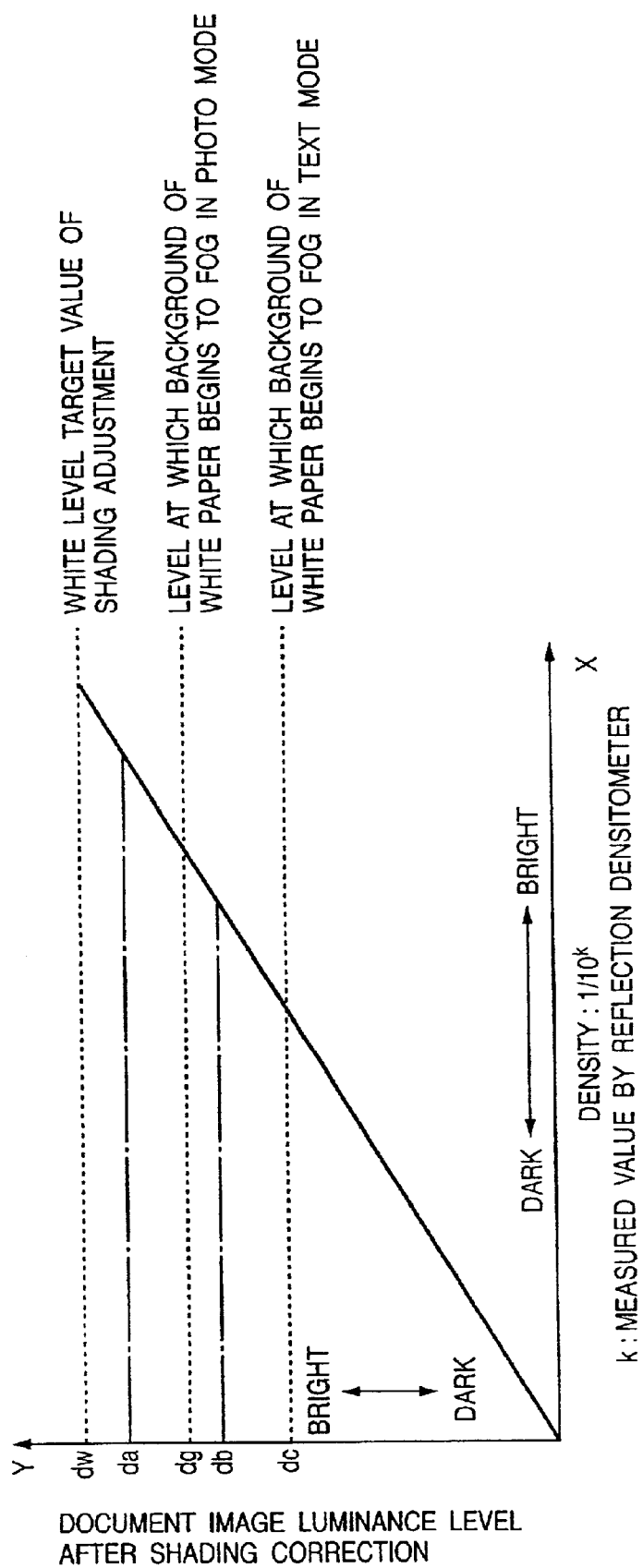
FIG. 7 is a graph showing the relationship between the image luminance level after shading correction, and the reflection density since the ON timing of a lamp in the first embodiment of the present invention.
Figure 8:
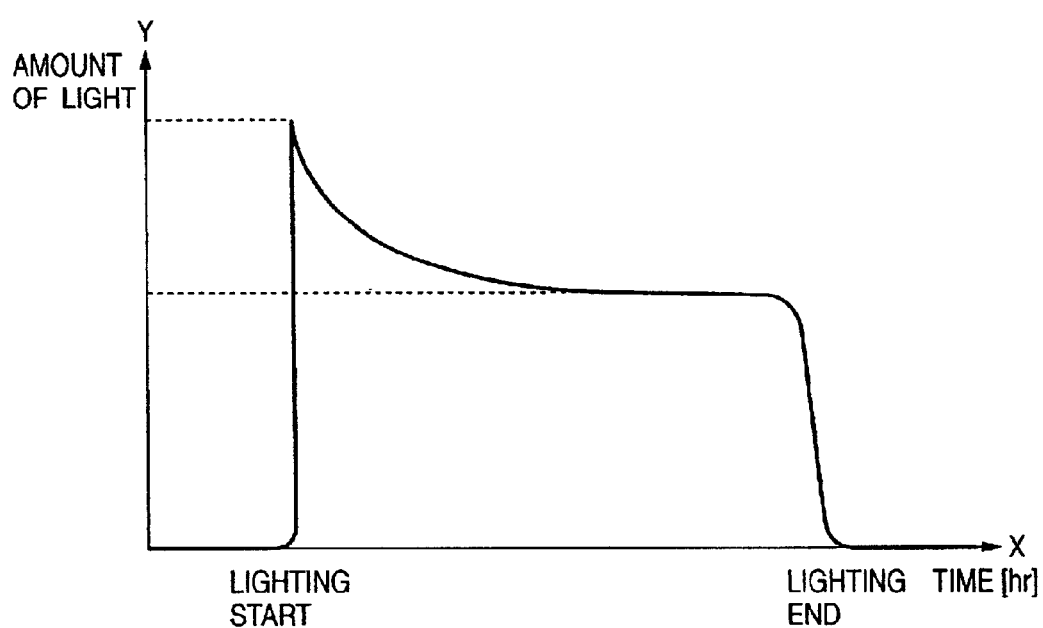
FIG. 8 is a graph showing a change in amount of light of an illumination light source along with a lapse of time.

The read start timing of image information of the standard white plate 101 (i.e., wait time) in each image mode in this embodiment will be explained below. FIG. 7 shows the relationship between the image luminance level and image density of the document 102 obtained as a result of reading image information of the standard white plate 101 at a timing after a lapse of the wait time corresponding to each image mode, and shading-correcting the image information of the document 102. The X-axis plots the density value obtained by reading a document using a reflection densitometer, and the Y-axis plots the luminance data after the document image is read by the image reading apparatus and undergoes shading correction.

When data of the standard white plate 101 is read while T=B, luminance data after shading correction is recognized to be smaller than that obtained by executing shading correction using shading correction data when T=A. That is, luminance data lower than practical data is detected. This is apparent from equation (2). For example, when da and db respectively represent the document image luminance levels after shading correction of the background of the document 102 when T=A and T=B, the relationship shown in FIG. 7 is obtained.

If dc and dg represent boundaries at which data obtained by reading the document 102 begins to express an image which is not "white" respectively in the text and photo modes, the relationship shown in FIG. 7 is obtained. That is, when the background of the document 102 is read while T=B, "white" is determined in the text mode, while "white" is not determined in the photo mode. This is because a small change in luminance data is expressed as tone change in the photo mode compared to the text mode. That is, when the document 102 is read in the text mode, the user of the image reading apparatus of this embodiment can obtain a good output image free from any fog of the background.

As described above, according to the first embodiment, the wait time required for reading an image can be minimized.

(Second Embodiment)

The second embodiment of the present invention will be described below. In the second embodiment, a xenon lamp is used as the lamp 103, and the image read operation start timing is set in correspondence with a time in which the lamp is left to stand. This control is performed in consideration of the following characteristics.

A xenon lamp, which is prevalently used as an illumination light source of the image reading apparatus in recent years, has dark start characteristics. In the characteristics, an ON delay occurs under the condition that the illumination light source is covered by a housing of the apparatus main body and no light enters. For this reason, a considerably long period of time is often required from when the lamp is turned on upon receiving an ON signal from a controller until a stable amount of light is reached, thus adversely influencing the copy speed and image read speed.

To solve this problem, a method disclosed in, e.g., Japanese Patent Laid-Open No. 10-254074 is proposed. In this method, when a document illumination lamp is kept OFF for a predetermined period of time, it is turned on in response to an ON signal having a predetermined period, thus relaxing the dark start characteristics.

However, when the lamp is turned on by the ON signal having the predetermined period, the life of the lamp suffers. Even when a wait time to be elapsed after the lamp is actually turned on by the lamp ON signal until its amount of light stabilizes is set, an optimal amount of light is not always obtained at the beginning of image read.

Hence, in the second embodiment, the ON time interval of the lamp 103 is measured by the timer 103.

The operation of the image reading apparatus in the second embodiment of the present invention will be explained below with reference to FIG. 4.

In the second embodiment as well, when the controller 119 of the image reading apparatus detects a signal which indicates that an image read start operation has been done upon depression of the copy button 120a on the console 120, this sequence starts. In step S301, a time period from when the lamp 103 was turned off to the current time is acquired from the timer 130. If the lamp 103 is ON, the timer 130 remains zero.

If the time period measured by the timer 130 has exceeded a predetermined time period h (YES in step S302), the wait time T is set to be a predetermined time period C longer than A and B in the first embodiment in step S303, and the flow advances to step S212.

On the other hand, if the measured time period is shorter than the time period h (NO in step S302), the flow advances to step S201. Since the processes in step S201 and the subsequent steps are the same as those in the sequence described in the first embodiment with reference to FIG. 3, the same step numbers denote the same processes, and a detailed description thereof will be omitted.

Therefore, in the second embodiment, if the OFF time of the lamp 103 is shorter than the time period h, text mode: T=B photo mode: T=A is set; if the OFF time has exceeded the time period h, text mode: T=C photo mode: T=C is set. That is, when the use time interval has exceeded the time period h, the wait time is set to be T=C (C≧A>B) in consideration of the dark start characteristics. That is, the xenon lamp has characteristics represented by dark start characteristics in which the time period required from when an ON signal is sent until the lamp is actually turned on changes depending on the OFF time period.

In this case, even in the text mode described in the first embodiment, image read operation starts as in the photo mode. That is, the wait time of the image read operation can be set to be T=C as a time period required until the amount of light of the lamp stabilizes.

(Modification of Second Embodiment)

The same effect as in the second embodiment can be obtained by setting the wait time of the image read operation by uniformly adding a predetermined value to each mode. For example, if the OFF time of the lamp 103 is shorter than the time period h (NO in step S302 in FIG. 5), text mode: T=B (step S211)

photo mode: T=A (step S221)

is set; if the OFF time of the lamp 103 has exceeded the time period h (YES in step S302 in FIG. 5), the currently set mode is checked (step S401), and text mode: T=B+t (step S403) photo mode: T=A+t' (step S402)

is set. In this process, when the lamp 103 is covered by the housing of the apparatus main body over the time period h and no external light enters, times t and t' are added to the predetermined wait times of the respective modes in consideration of the dark start characteristics. These times t and t' to be added may be equal to or different from each other.

In this way, even when dark start characteristics occur due to a long OFF time in the image reading apparatus using a xenon lamp as the lamp 103, image read operation can start in correspondence with an image processing mode selected, and the time required until document image read starts can be prevented from being prolonged.

In this embodiment, two different modes, i.e., the photo and text modes are described as predetermined modes. The photo mode is an example of a mode that requires tone expression from the high-density portion to the low-density portion, and the text mode is an example of other modes. Hence, the same effect can be obtained for a combination of a multi-valued mode and binary mode.

In this embodiment, a light source, in which an amount of light increases upon turning on the lamp overshoots, has been explained. Alternatively, even when a light source in which an increase in amount of light has a time lag is used, the wait time can be set in consideration of the dark start characteristics.

The standard white plate 101 in this embodiment can be a member that provides a reference upon correcting image read nonuniformity. Hence, the plate 101 need not be white, and even when the plate 101 is detachable or movable, the same effect can be obtained.

The present invention can be applied when the light source uses an incandescent lamp such as a fuse lamp, halogen lamp or the like, a fluorescent lamp such as an electrodeless rare gas lamp, hot cathode fluorescent lamp, cold cathode fluorescent lamp, semi-hot lamp, or the like, an LED, a gas laser, a semiconductor laser (LD), electroluminescence, or the like, and suffers overshoot or dark start characteristics.

In this embodiment, a document is placed on a table made of, e.g., glass, and image information is read by moving an optical system. Also, the same effect can be obtained when an optical system is fixed in position, and image information is read by moving a document, or when a document is attached to a cylindrical drum, and image information is read by rotating the drum about the shaft.

As described above, according to the present invention, the time required for reading an image can be minimized.

<Other Embodiment>

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

Figure 4:
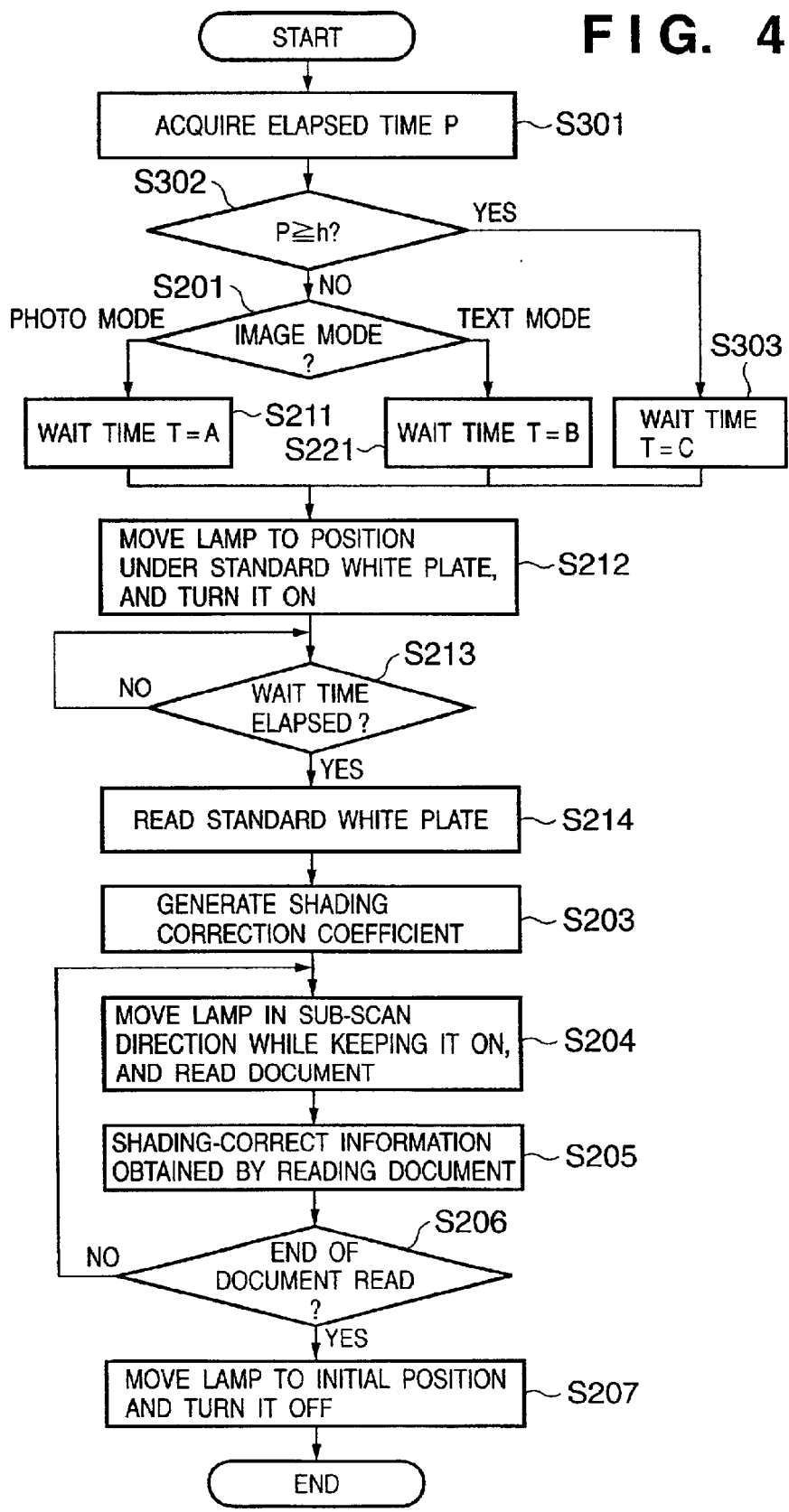
FIG. 4 is a flow chart showing the control sequence of the image reading apparatus in the second embodiment of the present invention.
Figure 5:
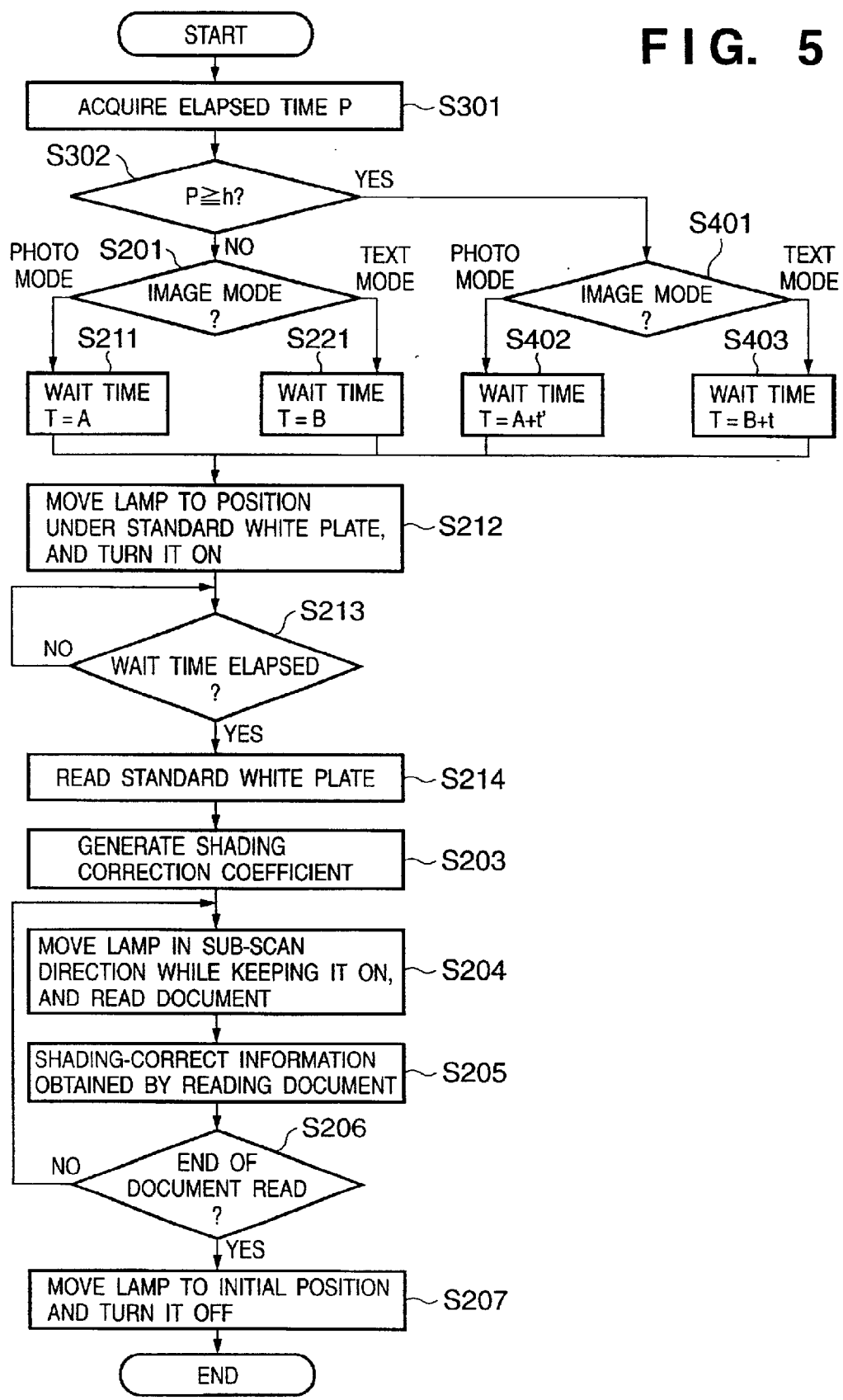
FIG. 5 is a flow chart showing the control sequence of the image reading apparatus in a modification of the second embodiment of the present invention.

In a case where the present invention is applied to the aforesaid storage medium, the storage medium stores program codes corresponding to the flowchart in FIG. 3, 4 or 5 described in the embodiments.

The present invention is not limited to the above embodiments and various changes and modifications can be made within the spirit and scope of the present invention. Therefore to apprise the public of the scope of the present invention, the following claims are made.

What is claimed is:

1. An image reading apparatus which can operate in a plurality of image processing modes, comprising:
   a photoelectric converter adapted to read an object image and outputting an electrical signal;
   a reference member used to correct image read nonuniformity of said photoelectric converter;
   an illumination light source adapted to illuminate an object and said reference member with light;
   a timer adapted to measure an elapsed time since a previous OFF timing of said illumination light source, and a time since said illumination light source is turned on;
   an instruction unit adapted to issue a read instruction of the object; and
   a controller, adapted to set a wait time in correspondence with the elapsed time measured by said timer and also in accordance with a currently set image processing mode of the plurality of image processing modes, that, when said instruction unit issues the read instruction of the object turns on said illumination light source again, and controls said photoelectric converter to begin to read said reference member after a lapse of the wait time since said illumination light source is turned on.

2. The image reading apparatus according to claim 1, further comprising a timer for measuring a time period elapsed since said illumination light source s turned on,
   wherein said controller sets a wait time in correspondence with the currently set image processing mode, and controls said photoelectric converter to begin to read said reference member after a lapse of the wait time since said illumination light source is turned on.

3. The image reading apparatus according to claim 1, wherein the image processing modes include a text mode and a photo mode, and a wait time in the photo mode is longer than a wait time in the text mode.

4. The image reading apparatus according to claim 1, wherein the image processing modes include a binary mode and a multi-value mode, and a wait time in the multi-valued mode is longer than a wait time in the binary mode.

5. The image reading apparatus according to claim 1, further comprising:
   a timer for measuring an elapsed time since a previous OFF timing of said illumination light source, and a time since said illumination light source is tuned on; and
   an instruction unit for issuing a read instruction of an object,
   wherein when said instruction unit issues the read instruction of the object, said controller sets the wait time in correspondence with the elapsed time measured by said timer and the currently set image processing mode, and turns on said illumination light source again, and controls said photoelectric converter to begin to read said reference member after a lapse of the wait time since said illumination light source is turned on.

6. The image reading apparatus according to claim 1, wherein when the time measured by said timer is not less then a predetermine time, said controller sets the wait time to be a predetermined time irrespective of the currently set image processing mode.

7. The image reading apparatus according to claim 6, wherein the image processing modes include a text mode and a photo mode, and when the time measured by said timer is shorter than the predetermined time, the wait time set in the photo mode by said controller is longer than the text mode.

8. The image reading apparatus according to claim 6, wherein the image processing modes include a binary mode and a multi-valued mode, and when the time measured by said timer is shorter than the predetermined time, the wait time set in the multi-valued mode by said controller is longer than the binary mode.

9. The image reading apparatus according to claim 1, wherein when the time measured by said timer is not less then the predetermined time, said controller sets the wait time to be longer than a wait time set when the measured time is less than the predetermined time.

10. The image reading apparatus according to claim 9, wherein when the time measured by said timer is not less than the predetermined time, said controller sets a wait time by adding an addition time to a wait time set in a corresponding image processing mode when the time measured by said timer is shorter than the predetermined time.

11. The image reading apparatus according to claim 9, wherein the image processing modes include a text mode and a photo mode, and a wait time in the photo mode is longer than a wait time in the text mode.

12. The image reading apparatus according to claim 9, wherein the image processing modes include a binary mode and a multi-valued mode, and a wait time in the multi-valued mode is longer than a wait time in the binary mode.

13. The image reading apparatus according to claim 1, wherein an amount of light emitted by said illumination light source decreases from an amount of light immediately after said illumination light source begins to emit light along wit a lapse of time, after said illumination light source is turned on.

14. The image reading apparatus according to claim 1, wherein said illumination light source is one of incandescent lamps including a xenon lamp, fuse lamp, halogen lamp, and the like, fluorescent lamps such as an electrodeless rare gas lamp, hot cathode fluorescent lamp, cold cathode fluorescent lamp, semi-hot lamp, and the like, an LED, a gas laser, a semiconductor laser (LD), and electroluminescence.

15. The image reading apparatus according to claim 1, wherein said reference member is detachable.

16. A control method for controlling an image reading apparatus which can operate in a plurality of image processing modes, and includes a photoelectric converter for reading an object image and outputting an electrical signal, a reference member used to correct image read nonuniformity of the photoelectric converter, and an illumination light source for illuminating an object and the reference member with light, said method comprising:
    issuing a read instruction of an object;
    measuring a first time period since a previous OFF timing of the illumination light source;
    checking a currently set image processing mode of the plurality of image processing modes;
    setting a wait time in correspondence with the first time period and also in correspondence with the currently set image processing mode when the read instruction of the object is issued;
    turning on the illumination light source;
    measuring a second time period since the illuminating light source is turned on; and
    controlling the photoelectric converter to begin to read the reference member after a lapse of the wait time since the illumination light source is turned on again.

17. The control method according to claim 16, comprising:
    a checking step of checking the currently set image processing mode;
    a setting step of setting a wait time in correspondence with the currently set image processing mode;
    a time measurement step of measuring time since the illumination light source is turned on; and
    a control step of controlling the photoelectric converter to begin to read the reference member after a lapse of the wait time since the illumination light source is turned on.

18. The control method according to claim 16, wherein the image processing modes include a text mode and a photo mode, and a wait time in the photo mode is longer than a wait time in the text mode.

19. The control method according to claim 16, wherein the image processing modes include a binary mode and a multi-valued mode, and a wait time in the multi-valued mode is longer than a wait time in the binary mode.

20. The control method according to claim 16, comprising:
    an instruction step of issuing a read instruction of an object;
    a first time measurement step of measuring an elapsed time since a previous OFF timing of the illumination light source;
    a checking step of checking the currently set image processing mode;
    a setting step of setting, when the read instruction of the object is issue in said instruction step, the wait time in correspondence with the elapsed time measured in said first time measurement step, and the currently set image processing mode;
    a turn-on step of turning on the illumination light source;
    a second time measurement step of measuring time since the illumination light source is turned on; and
    a control step of controlling the photoelectric converter to begin to read the reference member after a lapse of the wait time since the illumination light source is turned on again.

21. The control method according to claim 16, wherein when the first time period is not less than a predetermined time, the wait time is set to be a predetermined time irrespective of the currently set image processing mode.

22. The control method according to claim 21, wherein the image processing modes include a text mode and a photo mode, and when the first time period is shorter than the predetermined time, the wait time set in the photo mode is longer than the text mode.

23. The control method according to claim 21, wherein the image processing modes include a binary mode and a multi-valued mode, and when the first time period is shorter than the predetermined time, the wait time set in the multi-valued mode is longer than th binary mode.

24. The control method according to claim 16, wherein when the first time period is not less than the predetermined time, the wait time is set to be longer than a wait time set when the measured time is less than the predetermined time.

25. The control method according to claim 24, wherein when the first time period is not less than the predetermined time, a wait time is set by adding an addition time to a wait time set in a corresponding image processing mode when the first time period is shorter than the predetermined time.

26. The control method according to claim 24, wherein the image processing modes include a text mode and a photo mode, and a wait time in the photo mode is longer than a wait time in the text mode.

27. The control method according to claim 24, wherein the image processing modes include a binary mode and a multi-valued mode, and a wait time in the multi-valued mode is longer than a wait time in the binary mode.

28. The control method according to claim 16, wherein amount of light emitted by the illumination light source decreases from an amount of light immediately after the illumination light source begins to emit light along with a lapse of time, after the illumination light source is turned on.

29. The control method according to claim 16, wherein the illumination light source is one of incandescent lamps including a xenon lamp, fuse lamp, halogen lamp, and the like, fluorescent lamps such as an electrodeless rare gas lamp, hot cathode fluorescent lamp, cold cathode fluorescent lamp, semi-hot lamp, and the like, an LED, a gas laser, a semiconductor laser (LD), and electroluminescence.

30. The control method according to claim 16, wherein the reference member is detachable.

31. A computer program product comprising a computer usable medium having computer readable program code means embodied in said medium for controlling an image reading apparatus which can operate in a plurality of image processing modes, and includes a photoelectric converter for reading an object image and outputting an electrical signal, a reference member used to correct image read nonuniformity of the photoelectric converter, and an illumination light source for illuminating an object and the reference member with light, said product including:

first computer readable program code means for issuing a read instruction of an object;

second computer readable program code means for measuring an elapsed time since a previous OFF timing of the illumination light source;

third computer readable program code means for checking the currently set image processing mode of the plurality of image processing modes;

fourth computer readable program code means for, setting a wait time in correspondence with the measured elapsed time and also in correspondence with the currently set image processing mode, when the read instruction of the object is issued;

fifth computer readable program code means for turning on the illumination light source;

sixth computer readable program code means for measuring time since the illumination light source is turned on;

seventh computer readable program code means for controlling the photoelectric converter to begin to read the reference member after a lapse of the wait time since the illumination light source is turned on again.

32. The computer program product according to claim 31, comprising:

first computer readable program code means for checking the currently set image processing mode;

second computer readable program code means for setting a wait time in correspondence with the currently set image processing mode;

third computer readable program code means for measuring time since the illumination light source is turned on; and fourth computer readable program code means for controlling the photoelectric converter to begin to read the reference member after a lapse of the wait time since the illumination light source is turned on.

33. The computer program product according to claim 31, comprising:

first computer readable program code means for issuing a read instruction of an object;

second computer readable program code means for measuring an elapsed time since a previous OFF timing of the illumination light source;

third computer readable program code means for checking the currently set image processing mode;

fourth computer readable program code means for, when the read instruction of the object is issued, setting the wait time in correspondence with the measured elapsed time, and the currently set image processing mode;

fifth computer readable program code means for turning on the illumination light source;

sixth computer readable program code means for measuring time since the illumination light source is turned on; and seventh computer readable program code means for controlling the photoelectric converter to begin to read the reference member after a lapse of the wait time since the illumination light source is turned on again.

* * * * *